Patented Apr. 23, 1940

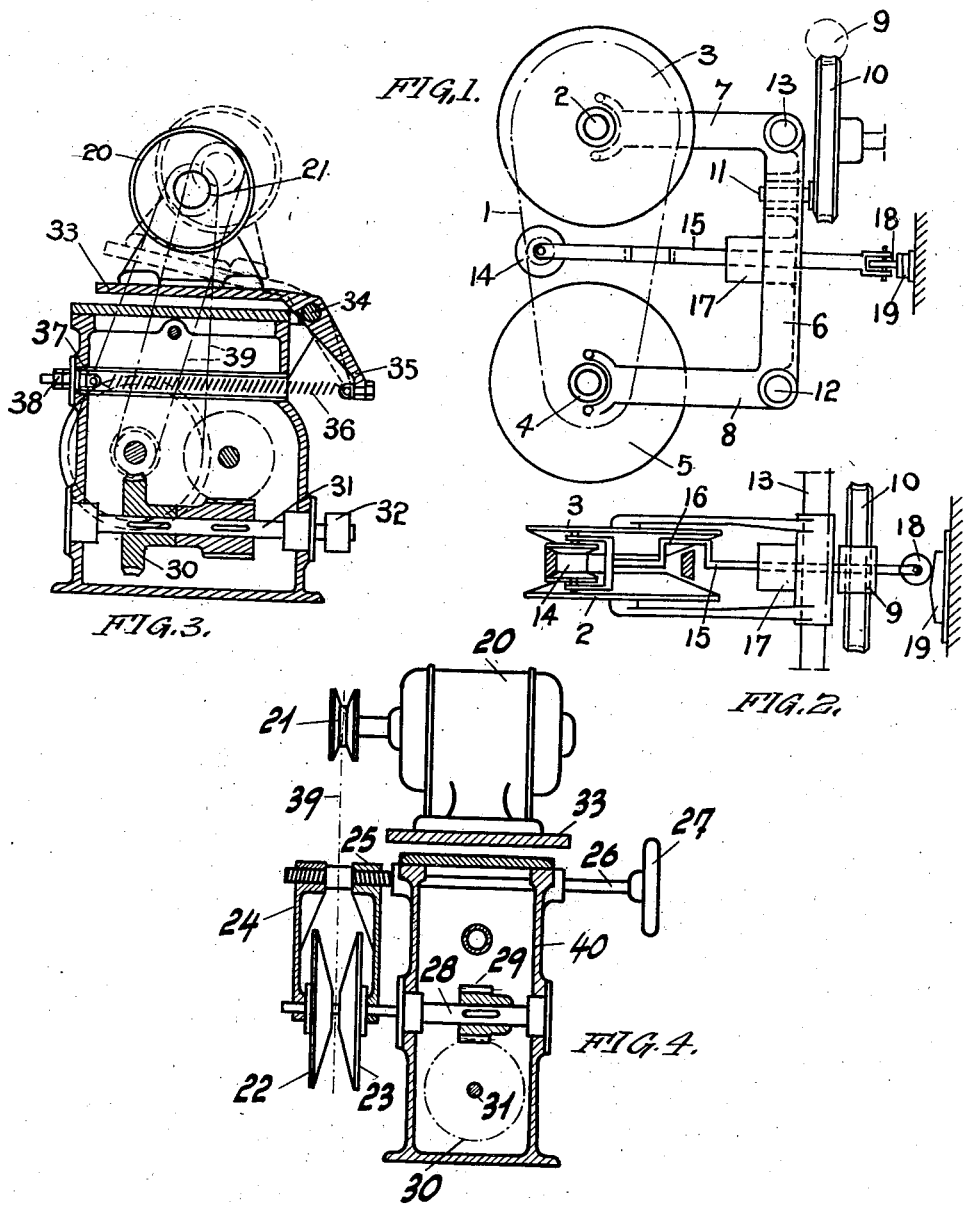

2,197,905

UNITED STATES PATENT OFFICE 2,197,905

INFINITELY VARIABLE EXPANDING PULLEY BELT GEAR

Walter Tögel, Cologne, Germany, assignor to Koeln Factory of Wilhelm Quester, Cologne-Suelz, Germany Application May 13, 1938, Serial No. 207,806
In Germany August 1, 1936

2 Claims. (Cl. 74—230.17)

With infinitely variable V belt gears with expanding cone pulleys, which, after the establishment of the desired gear ratio, are held against displacement in the axial direction by the action of the belt tension, it is a disadvantage that the sum of the arcs of contact with the two double cone pulleys and the corresponding straight connecting parts of the belt do not always remain the same, but change with the gear ratio. If no special provisions are made, it is therefore impossible for the belt to have the same tension at all gear ratios. The tension becomes too small below a particular range of gear ratios, and for other ranges is unduly high, so that damage to, or even breakage of the belt can take place.

The above disadvantage is avoided if, according to the invention for the purpose of maintaining the desired tension, a roller is provided which bears on the belt with a constant or substantially constant pressure. Preferably the roller bearing on the belt is additional to the expanding pulley or pulleys of the gear, and is mounted on a slidably mounted rod, the setting of which is adjusted in accordance with the gear ratio.

According to a modification of the invention, instead of employing an additional roller to bear on the belt, only one expanding pulley is employed in conjunction with a V grooved pulley of fixed diameter arranged on the shaft of the gear driving motor, and this pulley is employed to maintain the desired tension of the belt.

In the preferred constructional form of such a modified gear, the motor is arranged above the gear casing on a plate, which can swing about an axis parallel to the axis of the motor and is rotatable under the action of a long spring, preferably within the gear casing, in regard to the double cone pulleys.

In order that the invention may be more clearly understood and readily carried into practice two constructional examples according to the invention are shown in the accompanying drawing, in which:

Figures 1 and 2 are respectively a side elevation and a plan view of one form of gear according to the invention, and Figures 3 and 4 are front and side elevations respectively of a second form of gear according to the invention.

In Figures 1 and 2, I indicates a V-belt, which passes over two double cone expanding pulleys. Of each of the double pulleys, one pulley—pulleys 2 and 5—is fast on the corresponding shaft, whilst the two other opposite pulleys 3 and 4, lying on opposite sides of the belt, are slidable by means of a common adjustment yoke 6, whose arm 7 bears on the pulley 3 and arm 8 bears on the pulley 4. The arms 7 and 8 are of course in different planes lying on opposite sides of the belt 1. For moving the yoke 6, a worm 9, a worm wheel 10, and a bolt 11 attached to the latter are provided, the said bolt 11 engaging with the yoke 6 and producing sliding thereof in the direction of the axis of the pulleys. The sliding movement of the yoke 6 is guided by guide rods 12 and 13, which are fixed in the housing of the gear.

For the purpose of maintaining the desired tension in the belt, according to the invention a roller 14 is provided. This is rotatably journalled at the end of a rod 15, the middle of which is bent as at 16 to pass round one run of the belt and at the other end is slidably mounted in the yoke 6. At the other end the rod 15 is provided with a roller 18 which rolls on a cam 19 fixed to the housing, so that the rod 15 is moved outwardly or inwardly according to the belt tension and shape of the cam 19, as the yoke 6 is moved in the direction of the axes of the pulleys, as explained above. The cam is so shaped that with the various gear ratios of the gear obtained by the setting of the yoke 6, the roller 14 always bears on the belt with a constant pressure. The belt can therefore not slacken or become stretched so as to become damaged or broken.

In the modified form of gear illustrated by Figures 3 and 4, only a single double cone expanding pulley is employed, and the other V grooved pulley is of fixed diameter. Instead of employing an additional roller to bear on the belt with constant pressure, the V-groove pulley of fixed diameter, which is mounted on the shaft of the driving motor, is arranged to be resiliently yielding in regard to the double cone expanding pulley.

The driving motor is indicated by 20, and 21 indicates the V-groove pulley fastened on the motor shaft. 22 and 23 are the expanding cone pulleys which, in the example shown, are arranged below the motor. Both are adjustable in the axial direction. They are approached together if the forks 24 and 25 are brought together by the operation of a hand wheel 27 on a spindle 26 provided with right and left handed screw threads. Conversely by the same means the spacing between the two pulleys may be increased. However when once the desired gear ratio has been established the pulleys are only subjected to the action of the belt tension, just as in the case of the first construction herein described.

The cone pulleys are mounted on shaft 28 passing into the housing 40, which transmits the energy derived from the motor, by a worm 29, to the worm wheel 30, and through the shaft 31 of this worm wheel, outside the housing 40 to a belt pulley, toothed wheel, or the like 32. According to the invention the motor is resiliently yielding in relation to the double cone pulleys 22, 23. To this end the motor is arranged on a plate 33 which is mounted for rocking movement about a pivot 34 running parallel to the axis of the motor and along the side of the housing. The plate 33 is provided on the other side of the pivot 34 with a projecting arm 35, which extends substantially downwardly. To this arm 35 is attached a spring 36 which passes transversely through the upper part of the housing. The end 37 of the spring 36 remote from the arm 35 is adjustable by means of an adjusting device 38 in known manner so that by this means the tension of the spring can be varied. Since the spring arranged in this manner is of considerable length, and the arm 35 is relatively short, it follows that a large angular movement of the plate 33 corresponds to only a small change in the length and tension of the spring. Thus the tension of the belt 39 can be maintained at practically the same value for all gear ratios.

What I claim is:

1. In a motor driven variable speed device, a frame, a motor supporting plate pivoted at one side to one side of the top of said frame, an arm extending outwardly and downwardly from the pivotal point of said plate and rigidly fixed to the plate, a motor mounted on said plate and provided with a driving pulley, a shaft extending parallel to the axis of the motor and journalled in the lower part of the frame, said pulley having a V-grooved face, a pair of confronting frusto-conical pulley members splined on said shaft to form a driven pulley, means to adjust the distance between said pulley members, a V-shaped belt connecting the driving and driven pulleys, and spring means urging said arm downwardly and inwardly of the frame.

2. In a motor driven variable speed device, a frame, a motor supporting plate pivoted at one side to one side of the top of said frame, an arm extending outwardly and downwardly from the pivotal point of said plate and rigidly fixed to the plate, a motor mounted on said plate and provided with a driving pulley, a shaft extending parallel to the axis of the motor and journalled in the lower part of the frame, said pulley having a V-grooved face, a pair of confronting frusto-conical pulley members splined on said shaft to form a driven pulley, means to adjust the distance between said pulley members, a V-shaped belt connecting the driving and driven pulleys, a tube extending transversely of the frame and opening at one end toward the lower end of the arm, a closure for the other end of said tube and including spring adjusting means, and a spring having one end connected to the spring adjusting m.. .ns and its other end connected to the lower end of said arm.

WALTER TOGEL.